United States Patent
Moody et al.

(10) Patent No.: US 6,229,886 B1
(45) Date of Patent: *May 8, 2001

(54) METHOD AND APPARATUS FOR PROVIDING 56K MODEM TECHNOLOGY FOR PUBLIC SWITCHED TELEPHONE NETWORKS

(75) Inventors: Francis A. Moody, Washington, DC (US); Kyle D. McIntosh, Baltimore, MD (US)

(73) Assignee: Ciena Corporation, Linthicum, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,399

(22) Filed: Jan. 21, 1998

Related U.S. Application Data

(60) Provisional application No. 60/035,676, filed on Jan. 22, 1997.

(51) Int. Cl.[7] ......................................... H04M 7/00
(52) U.S. Cl. ..................... 379/219; 379/220; 379/93.01
(58) Field of Search ................................. 379/219, 220, 379/221, 207, 93.28, 93.01, 229, 230, 333; 370/352; 375/222

(56) References Cited

U.S. PATENT DOCUMENTS

| | | | |
|---|---|---|---|
| 4,565,903 | * 1/1986 | Riley | 379/220 |
| 4,771,425 | 9/1988 | Baran et al. | 370/85 |
| 4,903,292 | * 2/1990 | Dillon | 379/50 |
| 4,969,184 | 11/1990 | Gordon et al. | 379/100 |
| 5,001,744 | 3/1991 | Nishino et al. | 379/93 |
| 5,018,189 | 5/1991 | Kurosawa et al. | 379/93 |
| 5,347,566 | * 9/1994 | Law et al. | 379/27 |
| 5,355,362 | * 10/1994 | Gorshe et al. | 379/269 |
| 5,428,608 | 6/1995 | Freeman et al. | 370/60.1 |
| 5,513,251 | 4/1996 | Rochkind et al. | 379/93 |
| 5,550,905 | 8/1996 | Silverman | 379/142 |
| 5,583,996 | 12/1996 | Tsuchiya | 395/200.15 |
| 5,592,475 | * 1/1997 | Gliga et al. | 379/269 |
| 5,598,411 | 1/1997 | Matsukawa | 370/352 |
| 5,610,910 | 3/1997 | Focsaneanu et al. | 370/351 |
| 5,625,677 | 4/1997 | Feiertag et al. | 379/93 |
| 5,638,429 | 6/1997 | McIntyre | 379/100 |
| 5,668,857 | * 9/1997 | McHale | 379/93.07 |
| 5,692,043 | * 11/1997 | Gliga et al. | 379/327 |
| 5,953,318 | * 9/1999 | Nattkemper et al. | 370/236 |
| 5,995,618 | * 11/1999 | Bradley et al. | 379/333 |
| 6,081,555 | * 6/2000 | Olafsson | 375/242 |
| 6,115,460 | * 9/2000 | Crowe et al. | 379/211 |

* cited by examiner

*Primary Examiner*—Ahmad Matar
*Assistant Examiner*—Benny Q. Tieu
(74) *Attorney, Agent, or Firm*—Daniel N. Daisak; David L. Soltz

(57) ABSTRACT

To take advantage of 56K modem technology, a data signal must only traverse one digital to analog (D/A) conversion and one analog to digital (A/D) conversion on the return path to a subscriber. However, current data transmission for subscribers served by a Universal DLC system requires a D/A conversion at a voice switch of a public switched telephone network (PSTN), an A/D conversion at the central office terminal of a PSTN and a D/A conversion at a remote data terminal of a DLC system. This adds a D/A and an A/D conversion which causes 56K modem technology to fail. The present invention provides a telephone call routing apparatus installed between subscribers served by a Universal type digital loop carrier system, a central office terminal of a PSTN and a data network interface. The present invention avoids an additional digital to analog conversion performed at the PSTN voice switch and an additional analog to digital conversion performed at the PSTN central office terminal, thereby enabling 56K modem data transmission.

3 Claims, 5 Drawing Sheets

METHOD AND APPARATUS FOR PROVIDING 56K MODEM TECHNOLOGY FOR PUBLIC SWITCHED TELEPHONE NETWORKS

RELATED APPLICATION

This application claims the benefit of U.S. Provisional Application No. 60/035,676, filed Jan. 22, 1997.

FIELD OF INVENTION

The present invention generally relates to public switched telephone networks and more particularly to a method and apparatus for providing 56K modem technology support for public switched telephone network subscribers served by universal digital loop carrier systems.

BACKGROUND OF INVENTION

Within the Public Switched Telephone Network (PSTN), some subscribers are served by Digital Loop Carrier (DLC) systems which connect subscribers to a central office (CO) voice switch via efficient high speed digital connections. The path of a telephone call in a universal type DLC system requires that the signal intended for a particular subscriber must pass through one digital to analog (D/A) conversion at the voice switch, one analog to digital (A/D) conversion at the central office terminal (COT) and another D/A conversion at the remote data terminal of the universal type DLC system.

The rapid growth of Internet usage has resulted in the desire for faster data transmission. Modem technology has advanced to provide users with the ability to receive data at a rate of 56 kilo bits per second (56K). An example of such technology being standardized by the International Telecommunications Union as V.PCM type modems. This rate is desirable because of the increased amount of information available via the Internet. However there exists competing technologies attempting to become the industry standard for 56K transmissions. All these competing technologies rely on the return path modem signal traversing one D/A converter and one A/D conversion at a subscriber's receiver. Thus, 56K modem technology is available to most telephone subscribers except those served by Universal type DLC systems. This is due to the additional D/A and A/D conversions between the voice switch and the COT.

U.S. Pat. No. 5,610,910 entitled "Access to Telecommunications Networks In Multi-Service Environment" ("the '910 patent") describes a system which utilizes a CPE connector and a module to route traffic from customer premise equipment (e.g. a computer, fax machine or telephone) to one or more networks (e.g. PSTN, data, etc.). However, the module disclosed in the '910 patent decodes the received signal and analyzes the contents of the data to identify the network service requested (i.e. which ISP). The request must be reassembled (e.g. address conversion, rerouting, etc.) before re-transmitting it to the desired destination network. These additional steps compromise transmission time and provide unwanted data conversions.

Thus, there is a need to provide Universal DLC subscribers with the capability to use 56K modem service.

SUMMARY OF INVENTION

The invention meets these needs and avoids the above-referenced drawbacks by providing a method for enabling the operation of V.PCM modems connected to Universal type digital loop carrier systems, said method comprising the steps of monitoring telephone calls received from at least one telephone subscriber associated with a Universal type digital loop carrier system; routing at least one of the telephone calls directed to a particular one of a plurality of data networks around a central office terminal and a voice switch associated with a public switched telephone network; and transmitting data communication signals utilizing V.PCM modem technology from the data network to the subscriber associated with the Universal type digital loop carrier system.

In accordance with another embodiment of the present invention, a telecommunications system is provided that comprises a central office switch and a Universal type digital loop carrier network including a central office terminal and a remote terminal. The digital loop carrier network transmits and receives communication signals with a plurality of telephone subscribers associated with the Universal type digital loop carrier network. A routing unit communicates with the central office switch, the digital loop carrier network and a data service provider. The routing unit redirects the communication signals received from the data service provider away from the central office switch and the central office terminal to the remote terminal for transmission to one of the plurality of telephone subscribers.

DETAILED DESCRIPTION

Figure 1:
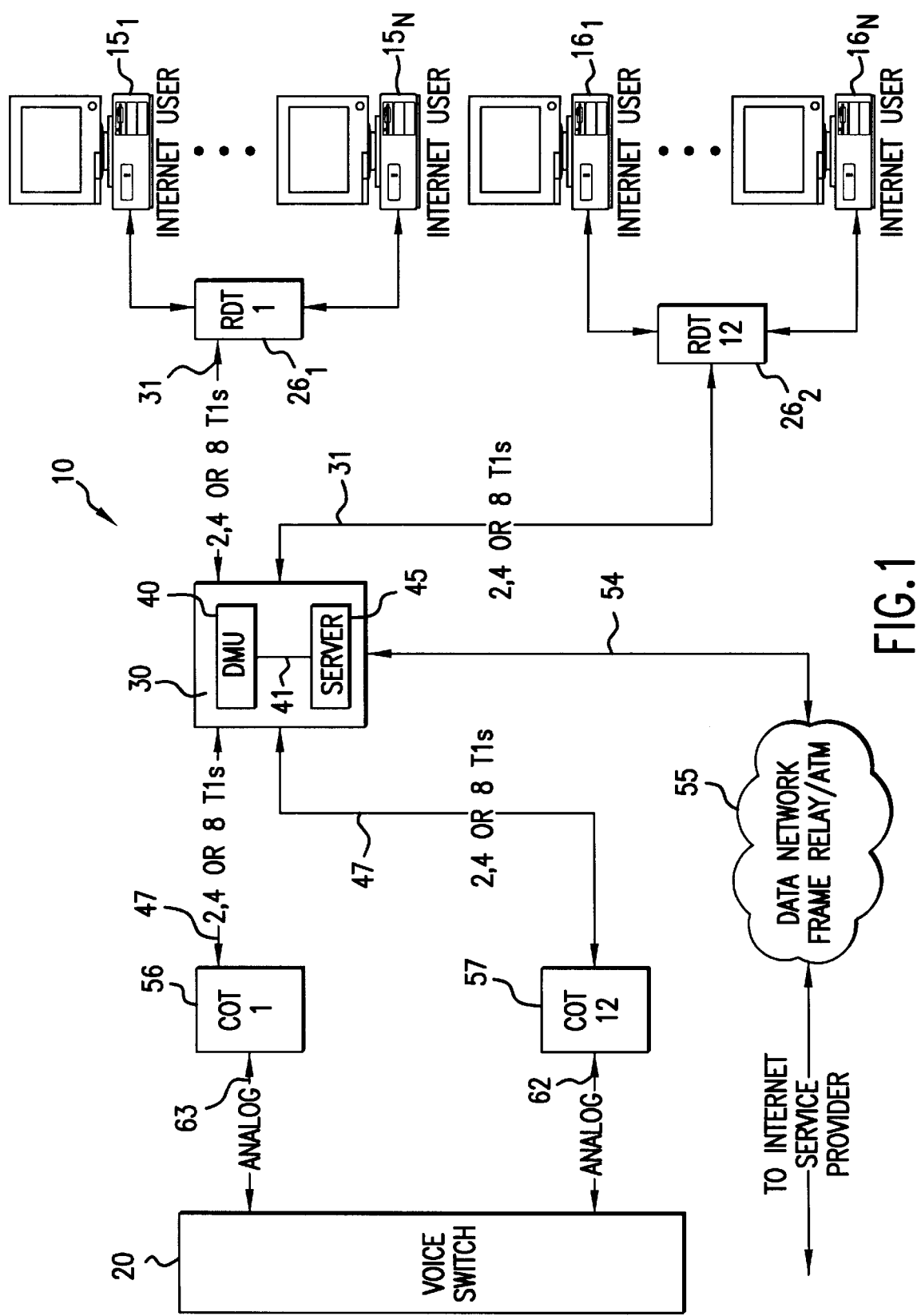
FIG. 1 is a block diagram of a phone network with an installed data routing system between a remote terminal, a data network and a central office and a voice switch in accordance with the present invention.

Turning to the drawings in which like reference characters indicate the same or similar elements, FIG. 1 is a block diagram of a local phone network 10. Subscribers $15_1 \ldots 15_N$ are connected to a first remote terminal (RT) $26_1$. Subscribers $16_1 \ldots 16_N$ are connected to a second RT $26_2$. The data routing system (DRS) 30 is installed between RTs $26_1$, $26_2$ and COTs 56, 57 via T1 lines 31 and 47, respectively. DRS 30 is configured to conform to the Bellcore TR-57 interface specification associated with Universal type DLC systems. DRS 30 monitors all incoming calls dialed by subscribers $15_1 \ldots 15_N$ and $16_1 \ldots 16_N$. Certain numbers, usually access numbers associated with Internet Service Providers (ISPs), are configured by the telephone service provider to be intercepted by DRS 30 and routed around COTs 56 and 57 to data network 55. The intercepted calls are transported from data network 55 to a particular ISP. If a standard voice call is placed by a subscriber or if a data call is made to an ISP that is not configured to receive re-directed calls, DRS 30 allows the call to go through to voice switch 20 as if DRS 30 was not present. Since the intercepted calls are routed around switch 20, D/A and A/D conversions performed at the voice switch 20 and COTs 56 and 57 are eliminated. Data transmitted in digital form from ISPs from data network 55 to RTs $26_1$, $26_2$ via DRS 30 avoids the D/A and A/D conversions performed at the voice switch 20 and COTs 56 and 57. This, as described above enables 56K modem technology or V.PCM type modems to operate correctly, thereby allowing subscribers to take advantage of faster transmission times from ISPs.

Figure 2:
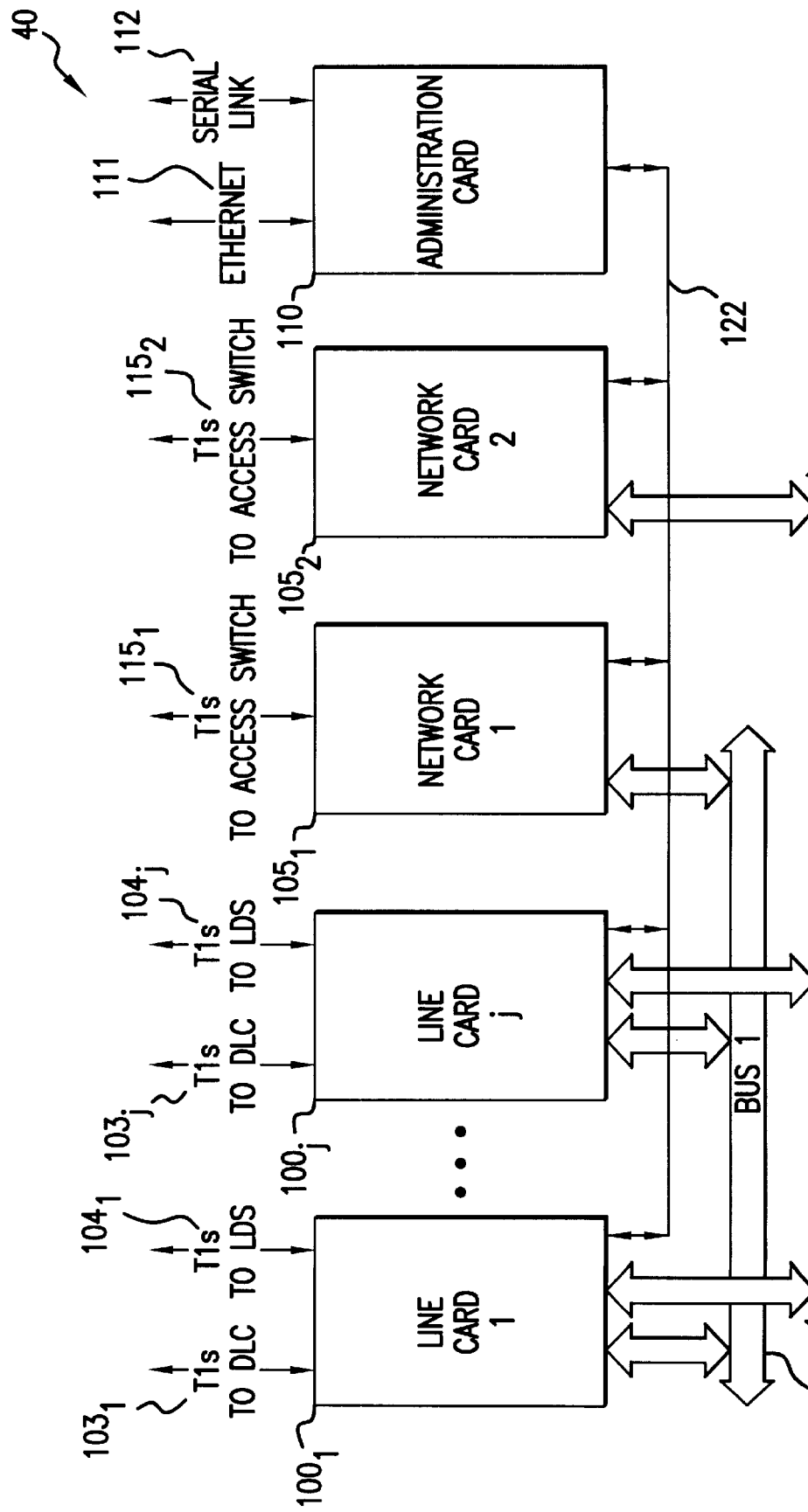
FIG. 2 is a block diagram of a data routing system monitoring unit in accordance with the present invention.

DRS 30 includes a DLC monitor unit (DMU) 40 and access server 45. FIG. 2 is a block diagram of DMU 40 which includes line cards $100_1 \ldots 100_j$, network cards $105_1$ and $105_2$ and administration card 110. Line cards $100_1 \ldots 100_j$ are connected to RTs $26_1$ and $26_2$ via line card ports $103_1 \ldots 103_j$ and T1 lines 31. Each line card $100_1 \ldots 100_j$ is allocated to a certain number of T1 lines 31, for example 8 or 10 T1 lines. The line cards $100_1 \ldots 100_j$ are also connected to COTs 56 and 57 by T1 lines 47 and line card ports $104_1 \ldots 104_j$. The T1 lines are high speed connections common in all telephony networks in the world which use standard rates and formats. For example, in the United States, Canada, Japan and select other countries T1 lines carry 24 voice channels and operate at 1.544 million bits per second (Mb/s). In the rest of the world, these lines are called E1 lines and carry 30 voice channels operating at 2.048 Mb/s. DMU 40 supports both E1 and T1 signals. Each DMU 40 can, for example, route 768 T1 data calls and 960 E1 data calls around voice switch 20 and COTs 56 and 57.

Each line card $100_1 \ldots 100_j$ looks for an off-hook transition from-each of its assigned subscribers, for example subscribers $15_1 \ldots 15_N$ or subscribers $16_1 \ldots 16_N$. The off-hook condition indicates that a subscriber is preparing to place a voice or data call. When an off-hook condition is detected by a line card $100_1 \ldots 100_j$ associated with the subscriber's T1 line, the subsequently dialed number is monitored by decoding the dual tone multi-frequency (DTMF) signals inserted by dialing digits on a common telephone or by dialing a telephone number via a computer modem.

DMU 40 also includes network cards $105_1$ and $105_2$. The network cards are used to provide an interface between line cards $100_1 \ldots 100_j$ and data network 55 via access server 45 or directly to access server associated with an ISP. Although FIG. 2 includes two network cards in a redundant configuration, it is understood that additional network cards and/or additional interfaces may be employed to accommodate additional ISP call traffic. Network cards $105_1$ and $105_2$ include ports $115_1$ and $115_2$, respectively which connect to lines 54 via T1 lines 41 as shown in FIG. 1. Lines 41 can provide, for example, D channel support for primary rate integrated services digital network (PRI). DMU 40 also includes a first data bus $120_1$ which provides connectivity between line cards $100_1 \ldots 100_j$ and network card $105_1$ and a second data bus $120_2$ which provides connectivity between line cards $100_1 \ldots 100_j$ and network card $105_1$. It should be understood that additional data buses can be used to accommodate more network and line cards in DMU 40.

DMU 40 also includes administration card 110 which is a CPU based card responsible for the management configuration of the system. Each of the line cards $100_1 \ldots 100_j$ and network cards $105_1$ and $105_2$ interface with administration card 110 via line 122. Administration card 110 is responsible for controlling which bus $120_1$ or $120_2$, which network card $105_1$ and $105_2$, and which T1 port on the selected network card an intercepted call will travel through DMU 40. This path is determined by the administration card based on available capacity within DMU 40. If the DTMF tones detected by one of the line cards $100_1 \ldots 100_j$ is associated with an ISP, the line card associated with the subscriber, for example line card $100_j$, hangs-up the call to switch 20 via COTs 56 or 57 and forwards the call to one of the network cards $105_1$ or $105_2$ via bus $120_1$ or $120_2$ based upon control signals received from administration card 110. Line card $100_j$ then signals switch 20 that the subscribers line is off hook for the duration of the ISP data call. In addition, administration card 110 controls protection relays in the event of a card failure or card removal. Administration card 110 supports an ETHERNET connection 111 for communicating with external network management systems as well as accommodating downloads of stored telephone numbers associated with particular ISPs. Serial link 112 of administration card 110 is available for local management and control of DMU 40.

Figure 3:
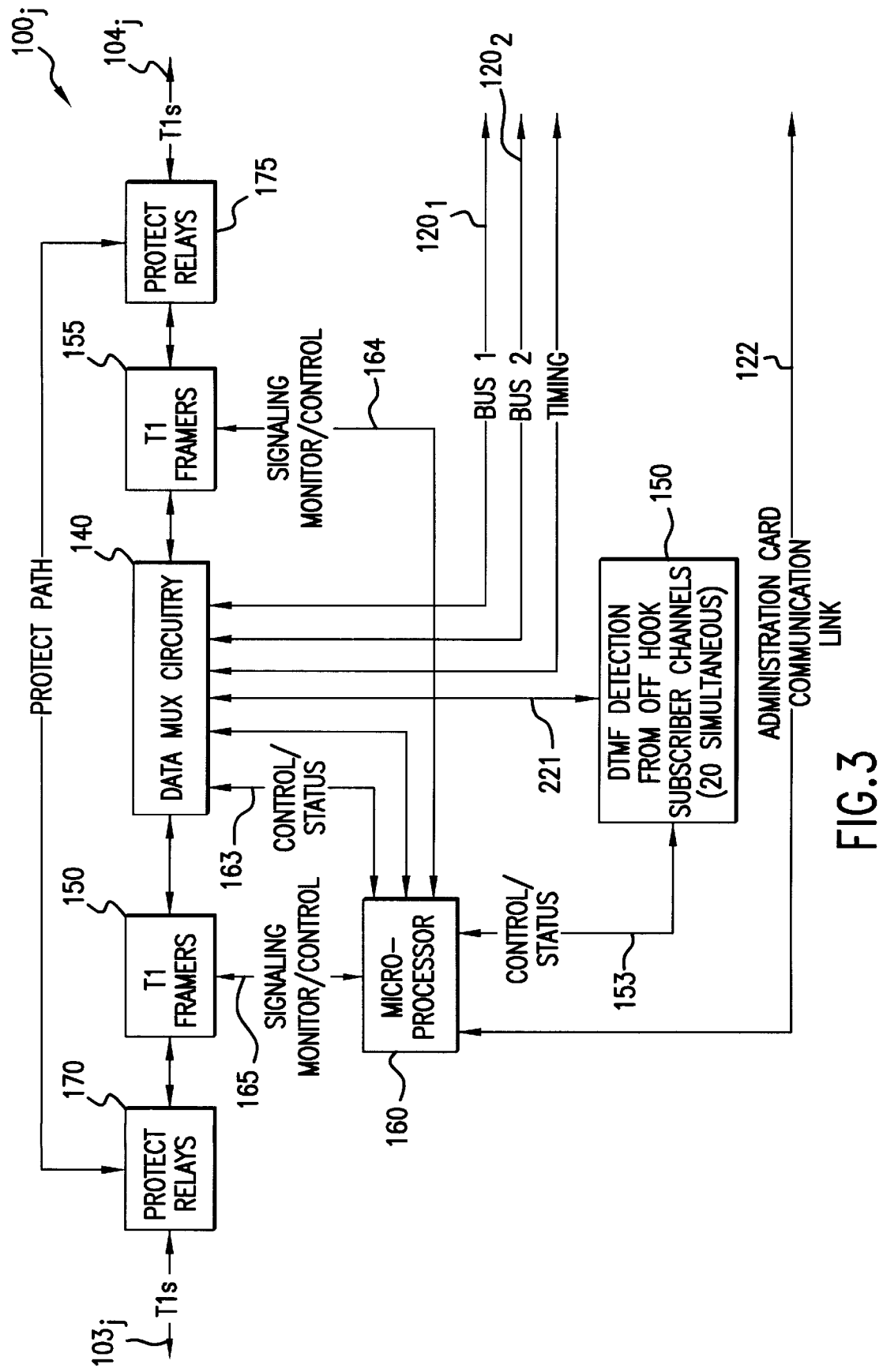
FIG. 3 is a block diagram of a line card in accordance with the present invention.

FIG. 3 is a block diagram of an exemplary line card $100_j$ having T1 framers. The logical operation of line card $100_j$ is the same whether it supports E1 or T1 lines. Line card $100_j$ includes data-mux circuitry 140 which receives the signals from T1 framers 150 and 155. T1 framer 150 receives the calls from the DLC 25 via line $103_j$. Data-mux circuitry 140 interfaces with DTMF detection module 150 to decode the DTMF signals inserted in the subscriber's channel.

Line cards $100_1 \ldots 100_j$ each include a microprocessor 160, for example an MPC860. Microprocessor 160 controls data-mux circuitry 140 via line 163 and communicates with DTMF detection module 150 via line 153. Microprocessor 160 stores a list of destination telephone numbers the local phone service provider(s) would like to detect and re-direct. These numbers are programmable and will typically be local phone numbers associated with particular high volume ISPs. However, data calls to any destination number can be re-directed. Because the re-directing of ISP intended calls is based on their associated phone numbers, only these phone numbers need to be stored which avoids the processing associated with lengthy user profiles and routing information. All calls are passed through line cards transparently via T1 framers 150 and 155. T1 framers 150 and 155 format the calls consistent with the Bellcore TR-08 digital interface specification and forward the calls to voice switch 20 via COTs 56, 57 where the calls are converted from D/A and A/D respectively. In this manner, standard voice calls and data calls not intended to be redirected pass transparently through line cards $100_1 \ldots 100_j$ to switch 20 via COTs 56, 57.

If the DTMF signals detected are associated with an ISP's telephone number to be re-directed around switch 20 and COTs 56, 57, data-mux 140 redirects the call to bus $120_1$ or bus $120_2$ and onto a particular network card $105_1$ or $105_2$ based on control signals received from administration card 110. Once the path through the selected network card has been established, the line card, for example line card $100_j$, must signal voice switch 20 to terminate the original call that the voice switch received during the detection and re-directing process. This is done by sending signaling information to the voice switch via framer 155 using an on hook signal to inform the switch that the call is terminated. Line card $100_j$ then sends signaling information to framer 155 to inform switch 20 that the subscriber $15_1 \ldots 15_N$ has left the phone off hook. Voice switch 20 assumes that the subscriber $15_1 \ldots 15_N$ is permanently in the off hook condition and will periodically poll to check for on hook status. This prevents additional calls from arriving to the subscriber $15_1 \ldots 15_N$ while the data call is active.

Additionally, protect relays 170 and 175 are also included within line card $100_j$ and are configured for protection path purposes in the event a particular line card is inoperable. Protect path 180 connects protect relays 170 and 175. In the event that a hardware failure in DMU 40 occurs, protection relays 170 and 175 route the T1 signals onto path 180 around DMU 40 as if the DMU was not installed between DLC 25 and switch 20. Alternatively, protect relays 170 and 175 can be separate cards which interface with line cards $100_1 \ldots 100_j$ and perform the same function.

Figure 4:
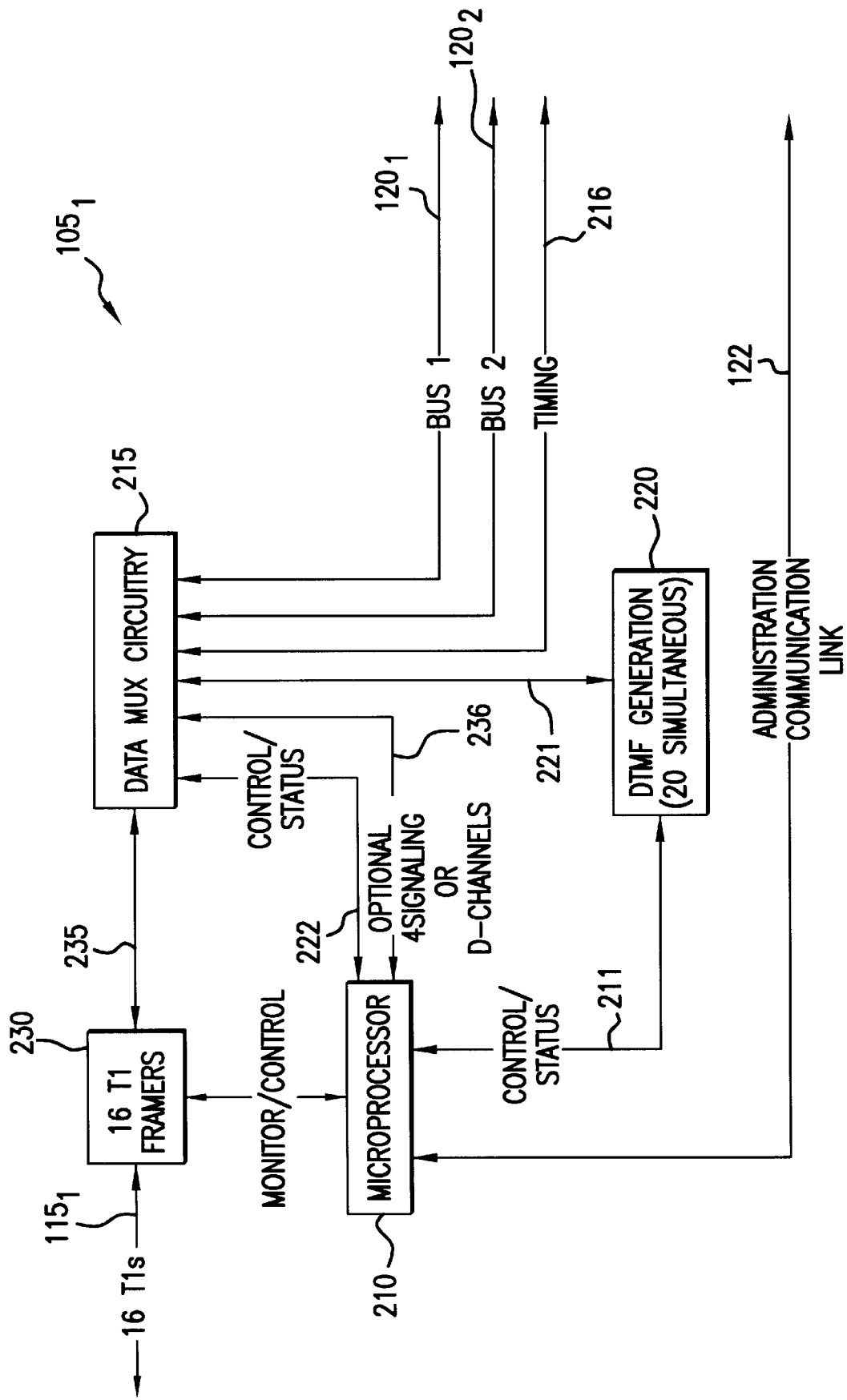
FIG. 4 is a block diagram of a network card in accordance with the present invention.

FIG. 4 illustrates a block diagram of an exemplary network card $105_1$ which places the received data call into a PRI or channelized T1 format for transmission over line 54 to data network 55 via access server 45. It should be understood that the following description is also applicable to other network cards in DMU 30. Similarly, network cards receive the data signals in digital form from an ISP via data network 55 and transmit these signals to RTs $26_1$, $26_2$ in digital form. In this manner, the data signals received by a subscriber $15_1 \ldots 15_N, 16_1 \ldots 16_N$ from an ISP via data network 55 do not undergo a D/A conversion at switch 20 and a A/D conversion at COTs 56, 57, thereby taking advantage of 56K or V.PCM type modems.

The PRI signal from network card $105_1$ is made up of 23 B and one D channel where the D channel includes, for example, on/off hook information, the subscriber dialed number, etc. Network card $105_1$ includes microprocessor 210 which receives a message from administration card 110 via line 122 to allocate a slot in either bus $120_1$ or $120_2$ to receive the new data call. Microprocessor 210 also receives a message from administration card 110 indicating which of the particular outgoing T1 lines $115_1$, which of the particular channels in the outgoing T1 line, and the particular telephone number the network card $105_1$ should dial using DTMF tones for channelized T1 or Q.931 messages for PRI ISDN T1s respectively, to connect the data call to data network 55 via access server 45. Microprocessor 210 receives these messages and interfaces with DTMF module 220 via line 211 to generate the appropriate DTMF signals associated with the intended ISP telephone access number.

Network card $105_1$ includes data-mux circuitry 215 which processes the incoming data calls via bus $120_1$ and $120_2$, timing signals via line 216, DTMF signals via line 221, control signals from microprocessor 210 via line 222, and outputs data calls to T1 framer 230 via line 235. Alternatively, either robbed signaling or D-channel interfaces are used between microprocessor 210 and data-mux circuitry 215 via line 236. By way of example, a network card $105_1$ in DMU 40 in accordance with one embodiment of the present invention can handle 384 or 480 re-directed data calls for T1 or E1 lines, respectively.

Figure 5:
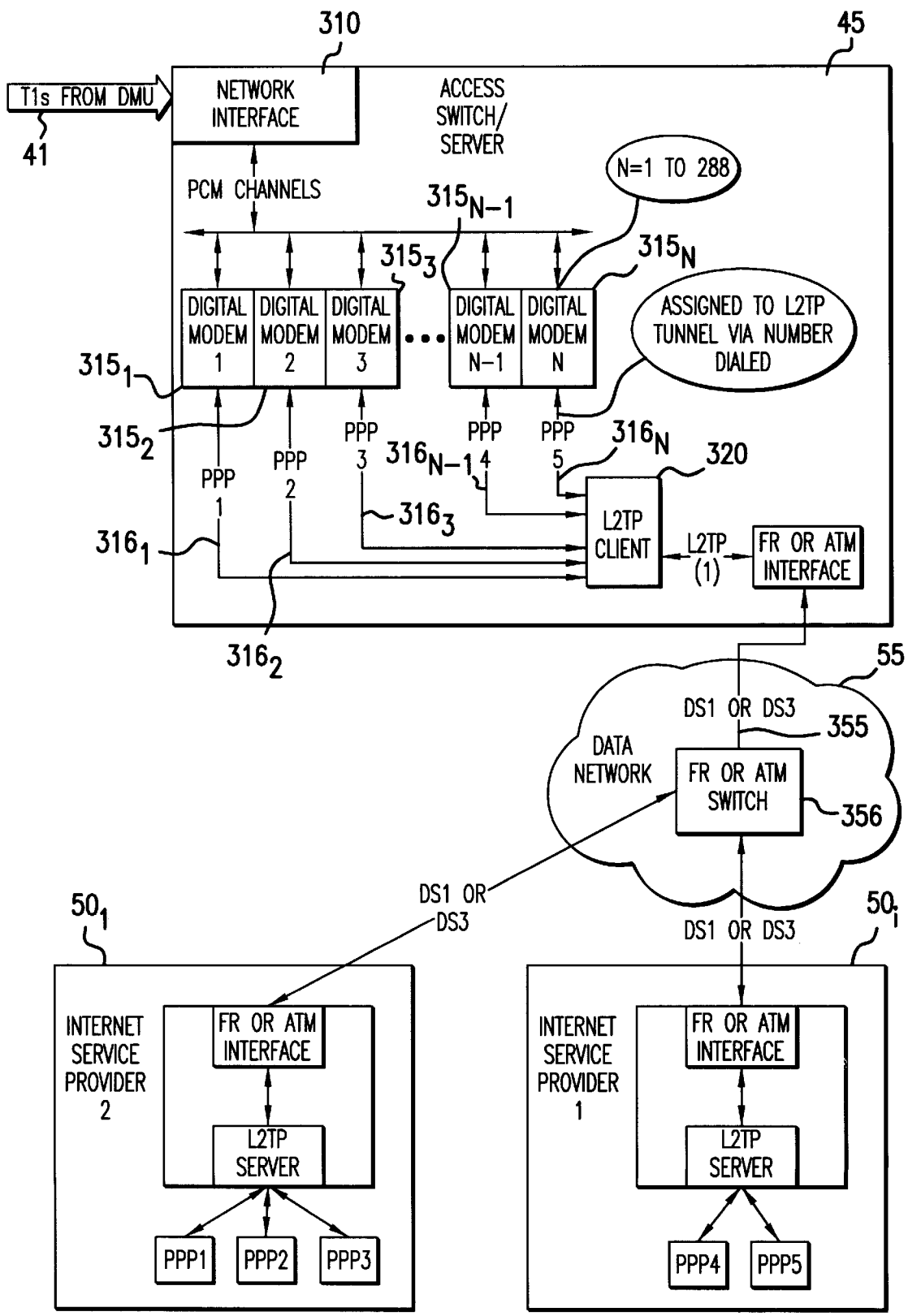
FIG. 5 is a block diagram of a portion of the telephone switch relief apparatus in accordance with the present invention.

FIG. 5 is a block diagram of a typical access switch/server 45, data network 55 and ISPs $50_1$ and $50_i$. Access server 45 is used to place the data call into frame relay or ATM formats for transmission to data network 55. Access server 45 receives the T1 lines 41 from DMU 40. Access server 45 includes a network interface 310 which receives the data calls and forwards them to digital modems $315_1 \ldots 315_N$, where N can be, for example, 1 to 288. Modems $315_1 \ldots 315_N$ are connected to L2TP client module 320 via lines $316_1 \ldots 316_N$. L2TP client sets up a virtual channel to communicate with a particular ISP $50_1$ and $50_i$. Access server 45 can be configured in one of two modes: L2TP mode where the access server knows the dialed number to put the call on appropriate tunnel to the ISP; and ISP mode where the access server just answers the call. In L2TP mode, the dialed number is passed to access server 45 by either using the basic Q.931 call control in case of ISDN PRI interface or DTMF digits in the case of channelized T1.

Data network 55 receives the redirected subscriber call in packet form via DS1 or DS3 lines 355. Frame relay or ATM switch 356 forwards the call to the appropriate ISP $50_1$ or $50_2$ as is generally known. Similarly, data signals received from ISPs via data network 55 are forwarded to RTs $26_1, 26_2$ via access server 45 in digital form.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A method for enabling the operation of V.PCM modems connected to Universal type digital loop carrier systems, said method comprising the steps of:

monitoring telephone calls received from at least one telephone subscriber associated with a Universal type digital loop carrier system, wherein at least one of said telephone calls is initially routed to a central office terminal and a voice switch associated with a public switched telephone network;

rerouting said at least one of said telephone calls initially routed to the central office terminal and the voice switch so that said at least one of said telephone calls is rerouted to a particular one of a plurality of data networks based on a telephone number associated with said at least one of said telephone calls and so that said at least one of said telephone calls is not routed through the central office terminal and the voice switch; and transmitting data communication signals utilizing V.PCM modem technology from said data network to said subscriber associated with said Universal type digital loop carrier system wherein the step of transmitting data communication signals further comprises transmitting said data communication signals to said subscriber via a remote terminal; and wherein the step of transmitting data communication signals further comprises transmitting said data communication signals in digital form such that said data communication signals are not converted into analog form prior to transmission to said remote terminal.

2. A telecommunications system comprising:

a central office switch;

a Universal type digital loop carrier network including a central office terminal and a remote terminal, said digital loop carrier network transmitting and receiving communication signals with a plurality of telephone subscribers associated with said Universal type digital loop carrier network, each of said communication signals being initially routed to said central office terminal and having a respective one of a plurality of telephone numbers associated therewith; and a routing unit communicating with said central office switch, said digital loop carrier network and a data service provider, said routing unit redirecting said communication signals initially routed to said central office switch and received from said data service provider such that said communications signals are rerouted away from said central office switch and said central office terminal to said remote terminal for transmission to one of said plurality of telephone subscribers based on said plurality of telephone numbers, wherein said one of said plurality of telephone subscribers receives said communication signals at a transmission rate associated with V.PCM modem technology; and wherein said communication signals redirected by said routing unit are in digital form, said remote terminal converting said communication signals from digital to analog form prior to transmission to said one of said plurality of telephone subscribers associated with said Universal type digital loop carrier network.

3. The system in accordance with claim 2 wherein said routing unit transmits control signals to said central office switch notifying said central office switch that a telephone circuit associated with said one of said plurality of telephone subscribers is in an off-hook condition.

* * * * *